United States Patent [19]

Jones et al.

[11] 4,349,967

[45] Sep. 21, 1982

[54] MAGNETIC FIELD COUPLED SPOUTED BED SYSTEM

[75] Inventors: Thomas B. Jones, Fort Collins, Colo.; Morris H. Morgan, Clifton Park; Peter W. Dietz, Delanson, both of N.Y.

[73] Assignee: General Electric Company, Schenectady, N.Y.

[21] Appl. No.: 194,630

[22] Filed: Oct. 6, 1980

[51] Int. Cl.³ .............................................. F26B 17/10
[52] U.S. Cl. .............................................. 34/1; 34/10; 34/57 A; 34/102
[58] Field of Search .................. 34/1, 102, 57 A, 10, 34/168, 169; 75/0.5 BA; 406/138, 142, 143, 127, 146; 55/138

[56] References Cited

U.S. PATENT DOCUMENTS 3,439,899  4/1969  Hershler .
3,440,731  4/1969  Tuthill .
3,911,594  10/1975  McIntire et al. ...................... 34/102
4,115,927  9/1978  Rosenweig .
4,229,234  10/1980  Krutenat et al. ............... 75/0.5 BA
4,247,987  2/1981  Coulaloglou et al. .................... 34/1

OTHER PUBLICATIONS

"Fluidization: Hydrodynamic Stabilization With a Magnetic Field", Rosenweig, 1979.
"Magnetically Stabilized Fluidized Beds", R. E. Rosenweig, et al., 1979.
"Magnetically Stabilized Beds—New Gas—Solids Contacting Technology", P. J. Lucchesi, et al., 1979.

*Primary Examiner*—Larry I. Schwartz
*Attorney, Agent, or Firm*—Paul J. Checkovich; James C. Davis, Jr.; Marvin Snyder

[57] ABSTRACT

Variable control is achieved over processes involving the spouting of magnetizable granular material in a draft tube-equipped spouted bed device through the application of a localized magnetic field in a spout inlet region of the device between an inlet of the draft tube and a portion of the device interior surface adjacent an associated fluid inlet.

15 Claims, 4 Drawing Figures

MAGNETIC FIELD COUPLED SPOUTED BED SYSTEM

BACKGROUND OF THE INVENTION

This invention relates to an improved spouted bed device, and more particularly, to a magnetic field coupled spouted bed device and a method for controlling the spout inlet conditions thereof.

Application Ser. No. 190816 which is assigned to the assignee hereof is a related copending patent application.

Spouted bed devices are widely employed in material processing operations such as grain drying, tablet coating, pneumatic transport, and in chemical reaction systems. The basic design and operation of spouted bed devices is well known in the art as evidenced by numerous publications including *Spouted Beds*, K. B. Mathur and N. Epstein, Academic Press, New York, 1974. An exemplitive spouted bed device is described in U.S. Pat. No. 2,786,280 (Gishler et al) which is incorporated herein by reference.

Conventional spouted bed devices typically include a bed of granular material into which a jet of fluid such as air is directed to form a spout in which a portion of the granular material is entrained. These conventional devices offer little control flexibility since variable parameters such as fluid flow rate and bed height are dependent on the properties of a given bed material. Accordingly, these parameters can only be varied within a narrow range, if at all.

More recently, pipe inserts or "draft tubes" have been positioned in the bed region above the vessel fluid inlet to force a large percentage of the fluid to travel up through the bed without diffusing therein, except in a spout inlet region between the fluid inlet and the draft tube inlet. In this manner the minimum fluid flow rate required for useful operation of a spouted bed device with a given bed material is reduced, allowing a somewhat greater operational flexibility. However, variable control over spout inlet conditions which can directly affect an associated material processing operation remains limited.

For example, the recirculation rate of bed material is potentially variable as a function of the fluid flow rate at the spout inlet. However, the minimum flow rate required for spouting in such a device with a given bed material can be varied only by physically adjusting the separation distance between the fluid and draft tube inlets, which is a rather complicated task. Additionally, as the flow rate is increased a greater percentage of the fluid diffuses and inefficiently bypasses the draft tube inlet. Further increases in the flow rate result in additional flow bypassing which may disrupt the solids movement in the granular bed with a corresponding loss of process control.

Accordingly, it is an object of the present invention to provide a means and a method for variably controlling processes carried out in a spouted bed device.

It is also an object of the present invention to provide an improved means for controlling the recirculation rate of granules in a spouted bed device.

It is a further object of the present invention to provide a means for channeling fluid from a fluid inlet into a draft tube of a spouted bed device upon an increase in the fluid flow rate.

Another object of the present invention is to enable the control of the solids delivery rate for a pneumatic transport system.

Still another object of the present invention is to provide a spouted bed device that may be employed with a variety of granular materials and fluid flow rates without requiring modifications to the geometry thereof.

SUMMARY OF THE INVENTION

The above and other objects and advantages are achieved in a spouted bed device which includes a draft tube equipped vessel for containing magnetizable granular material. The inlet of the draft tube is positioned in the vessel opposite of and spaced from a fluid inlet in a vessel base section. A means is provided for forming a localized magnetic field in a spout inlet region between the draft tube inlet and at least a portion of the vessel base section adjacent the fluid inlet. When the means are activated, granules of bed material tend to align along the force lines of the magnetic field and to resist entrainment into the fluid flowing through the spout inlet region. By adjusting the strength of the magnetic field the number of granules entrained into the fluid may be varied, thereby enabling the control of the recirculation rate in a spouted bed reactor, or control of the solids delivery rate of a pneumatic transport system. Similarly, the imposition of an appropriate magnetic field in the spout inlet region also enables the channeling of fluid flow into the draft tube.

BRIEF DESCRIPTION OF THE DRAWINGS

Other objects, features and advantages of the present invention may be appreciated from the accompanying drawings in which.

DETAILED DESCRIPTION OF THE DRAWINGS

Figure 1:
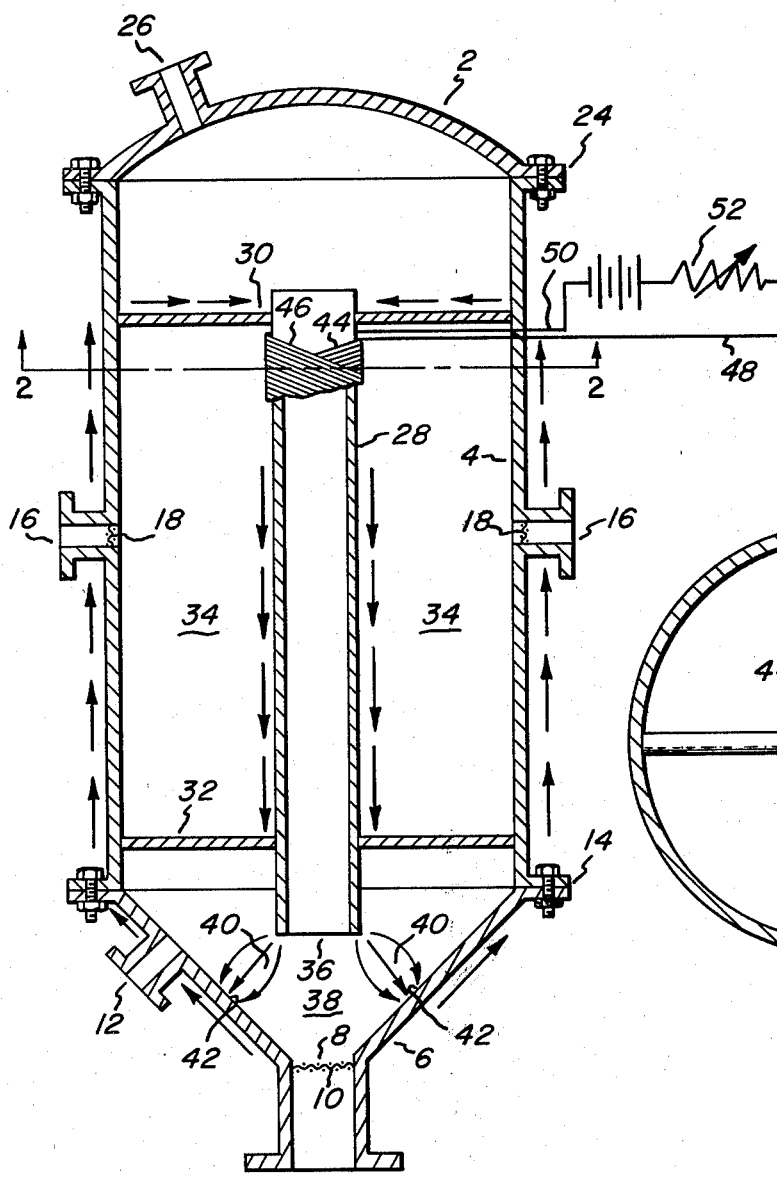
FIG. 1 is a longitudinal sectional view of an empty spouted bed device constructed according to an embodiment of the present invention, which view includes arrows representing a magnetic field circuit formed in the device.
Figure 2:
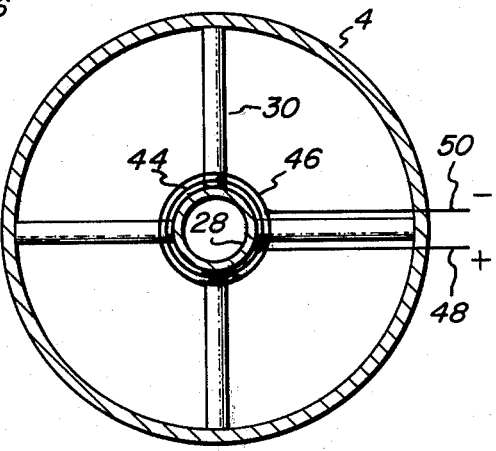
FIG. 2 is a transverse sectional view of the device depicted in FIG. 1 as seen along the line 2—2 and looking at the direction of the arrows.
Figure 3:
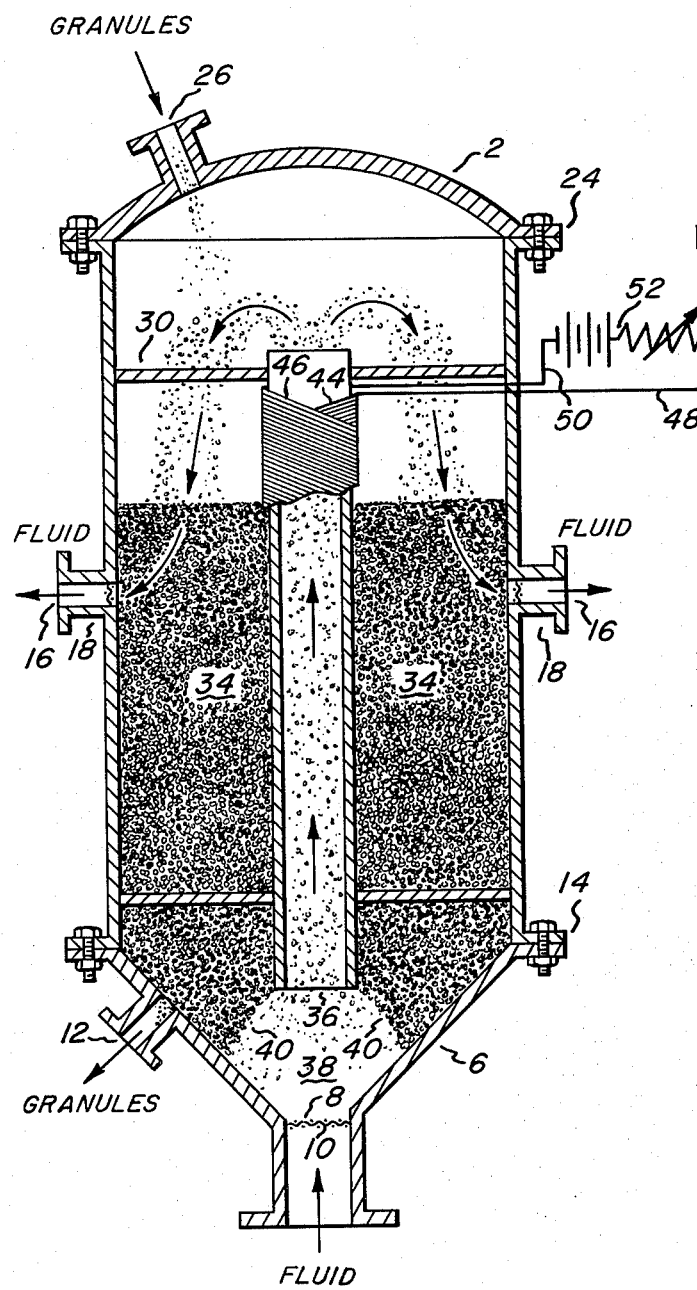
FIG. 3 is a similar sectional view of a device as illustrated in FIG. 1 which view depicts the device in an operational mode.

FIG. 1 depicts a preferred embodiment of the present invention which is useful in chemical reaction processes. The device is depicted as empty to facilitate description of its structural elements and of a magnetic field circuit developed therein. Additionally, a similar fully charged and operating device is depicted in FIG. 3. In both views the depicted device includes a three-piece vessel having a top section 2, a vertical cylindrical middle section 4 and a frustoconical base section 6. A fluid inlet 8 is positioned at the apex of the base section 6. A screen 10 is positioned below the inlet 8 to prevent bed material from entering the fluid supply system during periods of low flow while simultaneously minimizing any disruption to the fluid flow path in the vessel. An outlet 12 is also provided in the base section 6 to discard processed bed material.

The vessel middle section 4 is suitably attached to the base section 6 as by a bolted flange 14. Side fluid outlets 16 are formed in the middle section at a height suitable for contact with bed material as can be better appreciated from FIG. 3. Screens 18 are included in the outlets 16 to prevent undesirable bed material transfer from the vessel. Of course, conventional top mounted fluid outlets may also be employed with the present invention. The vessel top section 2 is attached to the middle section 4 as by a bolted flange connection 24. An inlet port 26 is provided in the top section 2 to enable the charging of the device with suitable granular bed material.

A draft tube 28 is positioned in the vessel by cruciform support structures 30 and 32 so as to define an annular bed region 34 between the draft tube and the inner surface of the vessel. The inlet 36 of the draft tube is located coaxially above the fluid inlet 8 at a distance much greater than the cross dimension of the granular material to be processed in the device. Typically the separating distance is approximately two times the diameter of the inlet 8. The volume 38 between the draft tube inlet 36 and the fluid inlet 8 is herein termed the spout region. Similarly, the region 40 in the bed 34 interfacing the spout region 38 between the draft tube inlet 36 and a portion 42 of the vessel base section adjacent the fluid inlet 8 is herein termed the spout inlet region.

A suitable electrically conductive wire is wound about a portion of the draft tube 28 to form a conductive coil thereat. More specifically, the wire is wound around the tube in a conventional manner to form two overlapping portions 44 and 46 of a conductive coil. Leads 48 and 50 from the coil are connected to a variable voltage source schematically depicted at 52 as to enable electric current to be supplied to the coil.

Upon the supply of current to the coil, a magnetic field is formed in the draft tube 28. A resulting magnetic field circuit is also formed as depicted in FIG. 1. In particular, the lines of magnetic force travel along the draft tube 28 and travel across the spout inlet region 40. The force then travels up the vessel base and middle sections 6 and 4, respectively, and across the support structure 30 to form a closed magnetic field circuit. Of course, this presupposes a proper selection of device materials to accomplish the closed circuit.

More specifically, the elements in the closed magnetic field circuit should be of a permeable material. Accordingly, the vessel middle and base sections 4 and 6, the draft tube 28, and the upper support section 30 are preferably constructed of a paramagnetic material such as steel. Additionally, in order to avoid the short circuiting of the magnetic field circuit, the lower support structure 32 should be constructed of a less permeable material such as aluminum. Thus, the spout inlet region 40 is preferably the only portion of the magnetic field circuit which is not constructed of a paramagnetic material.

However, during operation the spout inlet region 40 is filled with magnetizable granular bed material. Such materials include particles having a low or zero coercivity. This may include all ferromagnetic and ferrimagnetic substances. Similarly, the bed material may also include non-magnetizable materials coated with and/or containing dispersed therein solids which are magnetizable. For example, substances such as silicon particles which contain an amount of magnetizable material therein or spheres of a magnetizable material coated with a non-magnetizable catalytic material may both be processed in the present device.

In operation as depicted in FIG. 3, magnetizable granular material supplied to the bed 34 through the inlet port 26 is fed by gravity towards the spout inlet region 40 where granules are entrained in a flow of fluid such as air entering through the inlet 8. The entrained granules are transported in a dilute suspension through the draft tube 28. At the outlet of the draft tube the dilute suspension is diffused, causing the entrained granules to fall by gravity onto the top of the bed 34. The diffused fluid travels downward through the bed to the outlets 16 and is exhausted from the vessel. Processed granules are discarded through the outlet 12. In a typical application, the bed granules may be a material such as catalyst impregnated silicon which is contacted in the device with a reacting fluid.

Upon the application of sufficient current to the coil portions 44 and 46 a magnetic field is formed in the closed circuit which includes the spout inlet region 40. The magnetizable granules tend to be aligned along the force lines of the field in the spout inlet region 40 and tend to resist entrainment into the fluid flowing through the spout region 38. The tendency of the granules to resist entrainment increases with the strength of the magnetic field until a field is reached at which the granules are no longer entrained and the bed is said to be frozen. For ferromagnetic granules such as iron, even moderate magnetic fields (e.g. 0.01 Tesla) are sufficient to affect the granular flow, with correspondingly higher magnetic field strengths required for less permeable materials.

Accordingly, by adjusting the strength of the magnetic field in the spout inlet region 40 the recirculation rate of granules from the bed region 34 may be controlled. Similarly, the aligned granules in the spout inlet region tend to channel the fluid flow from the inlet 8 into the draft tube inlet 36. Thus, the aforementioned diffusion of fluid flow with increasing velocity and associated bypassing of the draft tube inlet can be avoided by the application of a suitable magnetic field in the spout inlet region. Additionally, rapid variations in the field strength can produce a controlled "slugging" process in which relatively large quantities of granules are entrained at periodic intervals. This type of operation is particularly useful in conjunction with granules which are relatively adhesive and might otherwise tend to adhere to each other so as to block the draft tube inlet 36.

The present invention exploits the bulk material property of magnetic permeability. Thus, the effectiveness of the present invention is not compromised by varying environmental conditions such as relative humidity as might be the case of a system relying on electrostatic field forces. Similarly, the use of magnetic forces allows the use of coated bed materials such as catalytic material coated iron pellets. Thus, the magnetic properties of the material of interest to a given process is not necessarily a limitation to the employment of the present invention. Accordingly, the present invention offers a wide range of potential applications in material processing.

Figure 4:
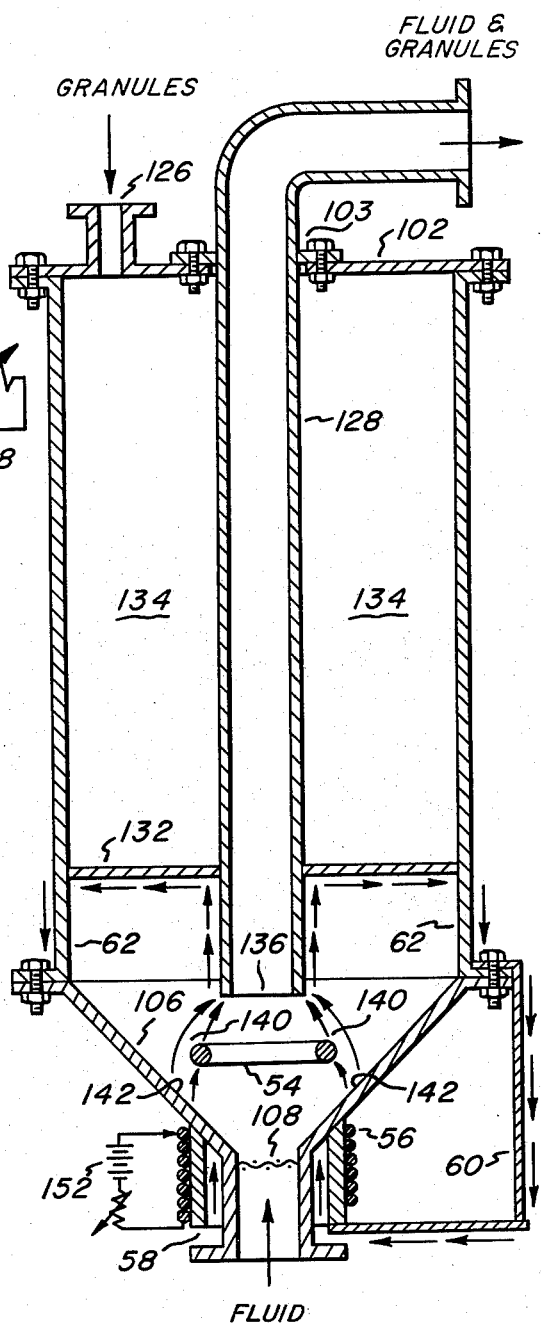
FIG. 4 is a longitudinal sectional view of a pneumatic transport system constructed according to an alternative embodiment of the present invention with arrows providing a schematic representation of magnetic field lines of force typically formed in an operational mode of the device.

Of course, in certain applications the environment within the spouted bed vessel may be detrimental to the coil portions 44 and 46. In such an application the coil is preferably positioned outside of the vessel as depicted in the embodiment of FIG. 4. This embodiment also includes the use of a ring interpole 54 to concentrate the magnetic field in the spout inlet region. Such a ring interpole 54 may be advantageously employed when the draft tube inlet is positioned relatively distant from the vessel base section, or in order to concentrate the field through permeable bed materials.

As also depicted in FIG. 4, the present invention may be employed in pneumatic transport systems. Thus, the draft tube 128 extends outside of the vessel, with the outlet thereof positioned at an external point of interest. As in the embodiment of FIGS. 1 and 3, the vessel includes three sections. However, the vessel top section 102 includes a collared opening which supports the draft tube 128. Similarly, the vessel middle section 104 includes no fluid outlets since fluid is exhausted through the draft tube in a pneumatic transport system. Likewise, the vessel base section 106 includes no outlet port for discarding granular material, since it is removed from the vessel as a dilute suspension through the draft tube 128. Moreover, since the draft tube 128 is supported by the collared opening 103, only a lower support structure 132 is provided. However, a screened fluid inlet 108 is similarly provided in the base section 106.

As noted above, the coil structure is advantageously located outside of the vessel in the embodiment of FIG. 4. Thus, a coil 56 is located around a ferromagnetic cylinder 58 affixed to a portion 142 of the vessel base section adjacent the fluid inlet 108. The coil 56 is attached to a conventional variable voltage source 152. To provide a suitable closed magnetic field circuit the vessel base section 106 is preferably formed of a relatively unpermeable material such as aluminum. The ring interpole 54, draft tube 128, support structure 132, and vessel middle section 104 are preferably formed of a highly permeable material, and more preferably of a ferromagnetic material such as steel. Additionally, a magnetic field return structure 60 preferably constructed of a ferromagnetic material and connecting the vessel middle section 104 and the bottom of the cylinder 58 is also included to complete the circuit.

In operation, current flows through the coil 56 forcing a magnetic field to flow from the cylinder 58 across the spout inlet region 140 through a portion of the draft tube 128 and the support structure 130 before returning through a portion 62 of the vessel and the return structure 60 to the bottom of the cylinder 58. The ring interpole 54 serves to concentrate the lines of magnetic force across the spout inlet region 140.

As in the embodiment described hereinabove and illustrated in FIGS. 1 and 3, granules are admitted through an inlet port 126 into a bed region 134 of the vessel from which they are fed by gravity through the spout inlet region 140. Fluid flowing from the fluid inlet 108 entrains particles from the inlet region 140 and transports them as a dilute suspension through the draft tube 128 to a point of interest by varying the strength of the magnetic field in the spout inlet region 140 the amount of material entrained into the draft tube 128 and hence transported from the vessel may be varied, with the amount transported increasing with decreasing field strengths.

The above-described embodiments of this invention are intended to be exemplitive only and not limiting and it will be appreciated from the foregoing by those skilled in the art that many substitutions, alterations and changes may be made to the disclosed device and method without departure from the spirit or the scope of the invention.

What is claimed is:

1. A spouted bed device comprising:
   a vessel for containing a bed of magnetizable granular material which vessel includes a vertically disposed lower base section and a fluid inlet disposed in the base section for entraining the magnetizable granular material;
   a tubular member having an inlet positioned in the vessel spaced vertically above and in flow communication with the fluid inlet and an outlet terminating in an upper portion of the vessel whereby the entrained material flows through said tubular member from said inlet to said outlet and thereafter returns to said bed; and
   means for forming a magnetic field oriented in the device with the lines of force extending between the tubular member inlet and a portion of the vessel base section adjacent the fluid inlet to regulate the flow of magnetizable granular material into the inlet of said tubular member.

2. A device as in claim 1 including means for forming a localized magnetic field oriented in the device with lines of force extending between the tubular member inlet and a portion of the vessel base section adjacent the fluid inlet which field is suitable for maintaining granules of magnetizable material in the spout inlet region.

3. A spouted bed device comprising:
   a vessel for containing a bed of magnetizable granular material which vessel includes a vertically disposed lower base section and a fluid inlet disposed in the base section for entraining the magnetizable granular material;
   a tubular member having an inlet positioned in the vessel spaced vertically above and in flow communication with the fluid inlet so as to define a spout inlet region in the vessel between the tubular member inlet and a portion of the vessel base section adjacent the fluid inlet and having an outlet terminating in an upper portion of the vessel whereby at least a portion of the entrained material flows through said tubular member from said inlet to said outlet and thereafter returns to said bed; and
   means for forming a magnetic circuit in the device which circuit includes a portion across the spout inlet region to regulate the flow of magnetizable granular material into the spout inlet region.

4. A spouted bed device comprising:
   a vessel for containing a bed of magnetizable granular material, said vessel having a vertical axis and including a substantially frustoconical downwardly tapering base section with a fluid inlet at the apex thereof for entraining the magnetizable granular material;
   a tubular member positioned substantially coaxially in the vessel and having an inlet disposed opposite of and spaced vertically above and in flow communication with the vessel fluid inlet and an outlet terminating in an upper portion of the vessel whereby the entrained material flows through said tubular member from said inlet to said outlet and thereafter returns to said bed;
   a spout inlet region in the vessel between the tubular member inlet and a portion of the vessel base section interior surface adjacent the fluid inlet;

a bed region of the vessel extending vertically upwards from the spout inlet region between the vessel interior surface and the tubular member exterior surface; and means for forming a localized magnetic field across the vessel bed region in the spout inlet region to regulate the flow of magnetizable granular material into the inlet of said tubular member.

5. A device as in claim 4 in which the bed region contains a quantity of magnetizable granular material.

6. A device as in claim 5 in which said magnetizable granular material includes composite granules formed of a multi-component material, with at least one of the components being a magnetizable material.

7. A device as in claim 6 wherein at least a portion of the composite granules include silicon as a component thereof.

8. A device as in claim 5 wherein said magnetizable granular material comprises granules having a core of a magnetizable first material coated with a second material which is less magnetizable than said core material.

9. A device as in claim 4 wherein the outlet of the tubular member is disposed outside of the vessel so as to enable the transfer of granules out of the vessel through the tubular member.

10. A method for controlling spout inlet conditions of a spouted bed device comprising the steps of supplying magnetizable granules to a spout inlet region of the device between a fluid inlet thereof and an inlet of a tubular member spaced from and in flow communication with the fluid inlet, directing a jet of fluid from the fluid inlet through the spout inlet region and into the tubular member inlet, entraining granules from the spout inlet region in the fluid jet, conducting the entrained granules through the tubular member, and controlling the rate of granule entrainment by imposing a magnetic field on granules in the spout inlet region.

11. A method for controlling spout inlet conditions of a spouted bed device comprising a vessel with a fluid inlet in a base section thereof, a draft tube positioned with an inlet thereof in the vessel spaced from and in flow communication with the fluid inlet, and a bed of magnetizable granular material contained in the vessel including at least a portion thereof contained in a spout inlet region of the device between the draft tube inlet and a portion of the vessel base section adjacent the fluid inlet, which method comprises the steps of;

directing a jet of fluid from the fluid inlet through the spout inlet region towards the draft tube inlet, entraining granules in the fluid from the spout inlet region so as to form a dilute suspension, transferring the dilute suspension from the spout inlet region through the tubular member, replacing entrained granules with granules from the bed, and imposing a localized magnetic field on at least a portion of the granules in the spout inlet region to regulate the entrainment of granules in the spouted bed device.

12. A method as in claim 10 or 11 in which the rate of granule entrainment is maintained substantially constant while increasing in the flow rate of the fluid jet by increasing the strength of the imposed magnetic field in the spout inlet region.

13. A method as in claim 10 or 11 in which the rate of granule entrainment is decreased by increasing the strength of the imposed field.

14. A method as in claim 10 or 11 in which the rate of granule entrainment is increased by decreasing the strength of the imposed field.

15. A method as in claim 10 or 11 in which the jet of fluid is directed into the draft tube inlet by imposing a magnetic field on magnetizable granular material in the spout inlet region and by adjusting the strength of the imposed magnetic field so as to align a plurality of magnetizable granules in the spout inlet region along the lines of force of the imposed field.

* * * * *